(12) United States Patent
Henin

(10) Patent No.: US 11,168,415 B2
(45) Date of Patent: Nov. 9, 2021

(54) CIRCUMFERENTIALLY CONTINUOUS AND CONSTRICTABLE TEXTILE SLEEVE AND METHOD OF CONSTRUCTION THEREOF

(71) Applicant: Federal-Mogul Powertrain LLC, Southfield, MI (US)

(72) Inventor: Delphine Henin, Choisy-au-Bac (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 323 days.

(21) Appl. No.: 15/639,053

(22) Filed: Jun. 30, 2017

(65) Prior Publication Data

US 2018/0002843 A1 Jan. 4, 2018

Related U.S. Application Data

(60) Provisional application No. 62/357,705, filed on Jul. 1, 2016.

(51) Int. Cl.
*D03D 1/00* (2006.01)
*D03D 3/02* (2006.01)
(Continued)

(52) U.S. Cl.
CPC ......... *D03D 1/0041* (2013.01); *D02G 1/0286* (2013.01); *D03D 3/02* (2013.01);
(Continued)

(58) Field of Classification Search
CPC ...... D03D 1/0035; D03D 1/0041; D03D 3/02; D03D 15/00; D03D 15/04; D03D 15/08;
(Continued)

(56) References Cited

U.S. PATENT DOCUMENTS 3,436,041 A 4/1969 Haller
3,466,210 A * 9/1969 Wareham ............ B29C 61/0633
156/86
(Continued)

FOREIGN PATENT DOCUMENTS

CN 203948853 U 11/2014
DE 202012103776 U1 10/2012
(Continued)

OTHER PUBLICATIONS

"Warp.", "Weft", "Filling", "Weave" Complete Textile Glossary. New York, NY: Celanese Acetate, 2001. N. pag. Print. (Year: 2001).*
(Continued)

*Primary Examiner* — Marla D McConnell
*Assistant Examiner* — Larissa Rowe Emrich
(74) *Attorney, Agent, or Firm* — Robert L. Stearns; Dickinson Wright, PLLC

(57) ABSTRACT

A protective textile sleeve and method of construction thereof is provided. The sleeve includes a circumferentially continuous wall extending lengthwise along a longitudinal axis between opposite ends. The wall has a first section formed from a non-heat-shrinkable, non-elastic yarn and a second section formed from one of a heat-shrinkable or elastic yarn. The first section extends lengthwise between the opposite ends and spans (X) degrees about the circumference of the wall between opposite lengthwise extending edges while in an unshrunken or stretch. The second section extends lengthwise between the opposite ends and spans (360-X) degrees about the circumference of the wall. The heat-shrikable or elastic yarn of the second section extends continuously as an uninterrupted yarn between the opposite edges of the first section.

19 Claims, 4 Drawing Sheets

(51) Int. Cl.
  *H02G 3/04* (2006.01)
  *D03D 15/56* (2021.01)
  *D03D 15/567* (2021.01)
  *D04B 21/18* (2006.01)
  *D04B 21/20* (2006.01)
  *H02G 15/18* (2006.01)
  *D02G 1/02* (2006.01)
  *D04C 1/06* (2006.01)
  *G02B 6/44* (2006.01)
  *D04C 1/04* (2006.01)

(52) U.S. Cl.
  CPC ........... *D03D 15/56* (2021.01); *D03D 15/567* (2021.01); *D04B 21/18* (2013.01); *D04B 21/205* (2013.01); *D04C 1/04* (2013.01); *D04C 1/06* (2013.01); *G02B 6/4459* (2013.01); *H02G 3/0481* (2013.01); *H02G 15/1813* (2013.01); *D10B 2401/041* (2013.01); *D10B 2505/12* (2013.01); *H02G 3/0462* (2013.01)

(58) Field of Classification Search
  CPC .......... D02G 1/0286; D04C 1/04; D04C 1/06; H02G 3/0462; H02G 3/0481; H02G 9/065; H02G 15/1813; D10B 2505/12; D04B 21/18; D04B 21/205; G02B 6/4459; B32B 1/08; B32B 3/06; B32B 7/028; B29C 61/0658; Y10S 174/08
  USPC .......................... 442/182, 184, 303; 428/913
  See application file for complete search history.

(56) References Cited

U.S. PATENT DOCUMENTS

| | | | |
|---|---|---|---|
| 3,669,157 A | 6/1972 | Woodall, Jr. et al. | |
| 4,624,720 A * | 11/1986 | Pithouse | B29C 61/0633 138/155 |
| 4,803,103 A * | 2/1989 | Pithouse | B29C 61/0616 138/123 |
| 4,900,596 A | 2/1990 | Peacock | |
| 5,467,802 A * | 11/1995 | Lusen | H01B 13/01263 138/123 |
| 5,843,542 A | 12/1998 | Brushafer et al. | |
| 6,265,039 B1 | 7/2001 | Drinkwater et al. | |
| 2006/0016507 A1* | 1/2006 | Baer | D03D 3/08 139/383 R |
| 2007/0240896 A1 | 10/2007 | Ott, Jr. et al. | |
| 2009/0081409 A1* | 3/2009 | Salzmann | B68G 7/05 428/113 |
| 2013/0224408 A1 | 8/2013 | Malloy et al. | |
| 2013/0260630 A1* | 10/2013 | Ito | D03D 1/00 442/205 |
| 2014/0174585 A1 | 6/2014 | Itoh | |
| 2014/0251490 A1 | 9/2014 | Marcellin et al. | |
| 2014/0256202 A1* | 9/2014 | Laurent | D06H 5/002 442/181 |
| 2014/0272218 A1* | 9/2014 | Thomas | D02G 3/38 428/35.1 |
| 2015/0233029 A1 | 8/2015 | Woodruff et al. | |

FOREIGN PATENT DOCUMENTS

| | | |
|---|---|---|
| JP | S62131424 A | 6/1987 |
| JP | 2012082529 A | 4/2012 |
| JP | 2012132109 A | 7/2012 |
| JP | 2016516912 A | 6/2016 |
| WO | 2014138167 A1 | 9/2014 |
| WO | 2014164679 A1 | 10/2014 |

OTHER PUBLICATIONS

International Search Report, dated Nov. 29, 2017 (PCT/US2017/040550).

* cited by examiner

CIRCUMFERENTIALLY CONTINUOUS AND CONSTRICTABLE TEXTILE SLEEVE AND METHOD OF CONSTRUCTION THEREOF

CROSS-REFERENCE TO RELATED APPLICATION

This application claims the benefit of U.S. Provisional Application Ser. No. 62/357,705, filed Jul. 1, 2016, which is incorporated herein by reference in its entirety.

BACKGROUND OF THE INVENTION

1. Technical Field

This invention relates generally to textile sleeves, and more particularly to circumferentially continuous and constrictable textile sleeves.

2. Related Art

It is known to protect elongate members in textile sleeves against a variety of environmental conditions and affects, or to just contain elongate members in textile sleeves for bundling and routing purposes. It is further known to construct the sleeves as woven sleeves having a seamless, circumferentially continuous wall formed with circumferentially continuous, heat-shrinkable yarns, wherein the hear-shrinkable yarns, upon being heat-shrunk, constrict the wall about the entirety of its outer surface and about the member being protected within the sleeve. The heat-shrinkable yarns extend completely about the circumference of the sleeve, in a weft-wise, circumferential direction, so that they effectively reduce the diameter of the sleeve upon being heat-shrunk. Although the circumferentially continuous heat-shrinkable yarns function generally well to constrict the entirety of the seamless wall about the members being protected, they add cost to the sleeve as a result of being a relatively costly yarn, and further, limit the type of protection cable of being provided by the wall.

Accordingly, what is needed is a protective sleeve that is simple to assemble about a member being protected, while at the same time being able to be brought into a relatively snug fit about the member in a cost effective manner, while at the same time being able to be selectively adapted to provide optimal protection against different types of environmental affects.

SUMMARY OF THE INVENTION

In accordance with one aspect of the invention, a protective textile sleeve includes a circumferentially continuous wall extending lengthwise along a longitudinal axis between opposite ends. The wall has a first section formed from a non-heat-shrinkable, non-elastic yarn and a second section formed from one of a heat-shrinkable or elastic yarn. The first section extends lengthwise between the opposite ends and spans (X) degrees about the circumference of the wall between opposite lengthwise extending edges while in an unshrunken or stretch. The second section extends lengthwise between the opposite ends and spans (360-X) degrees about the circumference of the wall. The heat-shrikable or elastic yarn of the second section extends continuously as an uninterupted yarn between the opposite edges of the first section.

In accordance with a further aspect of the invention, the wall has a radially expanded, unconstricted first state, wherein the heat-shrinkable yarn is in an unshrunken state or the elastic yarn is in a biased, stretched state, and the wall has a radially contricted second state, wherien the heat-shrinkable yarn is in a shrunken state or the elastic yarn is in a relaxed, reduced length state.

In accordance with a further aspect of the invention, the second section can be formed with a single heat-shrinkable yarn or a single elastic yarn meandering back-and-forth between the opposite lengthwise extending edges.

In accordance with a further aspect of the invention, the second section can be formed with a plurality of heat-shrinkable yarns or a plurality of elastic yarns meandering back-and-forth between the opposite lengthwise extending edges.

In accordance with another aspect of the invention, the first section can include lengthwise extending warp multifilament yarns to enhance coverage protection and tenacity.

In accordance with another aspect of the invention, the first section can include circumferentially extending, non-heat-shrinkable weft monofilament yarns to enhance hoop strength and resistance to abrasion.

In accordance with another aspect of the invention, the first section can include both lengthwise extending warp multifilament yarns to enhance coverage protection and tenacity and circumferentially extending non-heat-shrinkable weft monofilament yarns to enhance hoop strength and resistance to abrasion.

In accordance with another aspect of the invention, the first section can be formed entirely of lengthwise extending warp multifilament yarns having a tenacity equal to or greater than 6.0 grams per denier (g/d) for enhanced mechanical protection and circumferentially extending, non-heat-shrinkable weft monofilament yarns having a diameter between 0.15-0.25 mm.

In accordance with a further aspect of the invention, a method of constructing a textile sleeve is provided. The method includes interlacing yarns to form a circumferentially continuous wall extending lengthwise along a longitudinal axis between opposite ends; forming the wall having a first section formed from non-heat-shrinkable, non-elastic yarn extending lengthwise between the opposite ends and spanning (X) degrees about the circumference of the wall between opposite lengthwise extending edges; and, forming the wall having a second section formed from heat-shrinkable yarn or elastic yarn extending lengthwise between the opposite ends and spanning (360-X) degrees about the circumference of the wall, and interlacing the heat-shrinkable or elastic yarn continuously as an uninterrupted yarn between the opposite edges of the first section.

In accordance with a further aspect of the invention, the method can further include interlacing the heat-shrinkable or elastic yarn as a single yarn meandering back-and-forth between the opposite lengthwise extending edges of the first section.

In accordance with a further aspect of the invention, the method can further include interlacing the heat-shrinkable or elastic yarn as a plurality of yarns meandering back-and-forth between the opposite lengthwise extending edges of the first section.

In accordance with another aspect of the invention, the method can further include forming the first section including circumferentially extending, non-heat-shrinkable weft monofilament yarns to enhance hoop strength and resistance to abrasion.

In accordance with another aspect of the invention, the method can further include forming the first section including both lengthwise extending warp multifilament yarns to enhance coverage protection and tenacity and circumferentially extending non-heat-shrinkable weft monofilament yarns to enhance hoop strength and resistance to abrasion.

In accordance with another aspect of the invention, the method can further include forming the first section entirely of lengthwise extending warp multifilament yarns having a tenacity equal to or greater than 6.0 grams per denier (g/d) for enhanced mechanical protection and circumferentially extending, non-heat-shrinkable weft monofilament yarns having a diameter between 0.15-0.25 mm.

In accordance with a further aspect of the invention, the method can include weaving the wall of the sleeve.

In accordance with yet a further aspect of the invention, the method can include knitting the wall of the sleeve.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1A:
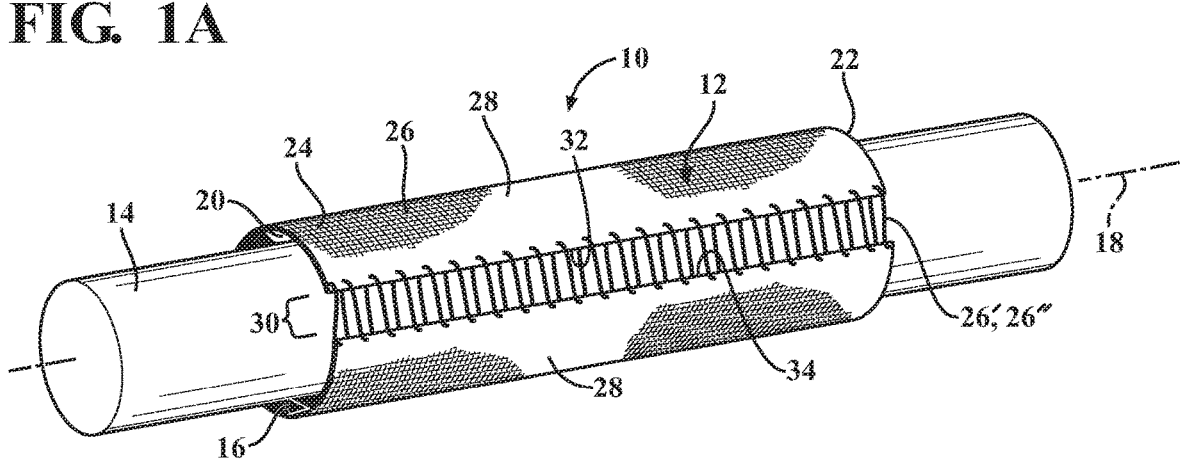
FIG. 1A is a schematic isometric view of a tubular sleeve constructed in accordance with one embodiment of the invention shown in a radially expanded first state about an elongate member to be protected.

Referring in more detail to the drawings, FIG. 1A shows schematic representation of a textile sleeve, referred to hereafter as sleeve 10, having a circumferentially continuous wall 12 constructed in accordance with one aspect of the invention. Circumferentially continuous walls are sometimes referred to as "closed", as they do not having lengthwise extending free edges, as opposed to "open" walls, which do. The sleeve 10 is used for routing and protecting elongate members 14 contained therein, such as conduits, wires, wires contained in sheaths or a bundled wire harness, for example, from exposure to environmental effects, such as abrasion and the ingress of contamination, debris and the like, by way of example and without limitation. The wall 12 bounds a central cavity 16 that extends along a longitudinal central axis 18 between opposite open ends 20, 22, wherein the elongate member 14 is disposed and contained in the cavity 16. The wall 12, in accordance with one aspect of the invention, can be woven, or in the alternative, knit, with warp yarns 24 that extend lengthwise in generally parallel relation to the central axis 18 and weft yarns 26, also referred to as fill yarns, that extend circumferentially in a weft-wise or fill direction about the wall 12 and generally transversely to the central axis 18. The fill yarns 26 of the wall 12 are provided as both non-heat-shrinkable yarns 26 and as heat-shrinkable yarn 26', or in the alternative as elastic yarn 26". The non-heat-shrinkable yarns 26 provide the desired protection characteristics to the wall 12, whereas the heat-shrinkable or elastic yarn 26', 26" provide the wall 12 with an ability to be easily and readily installed about the elongate member 14 while in a non-heat-shrunken, or stretched, if elastic, lengthened and "as woven or as knit" first state (FIGS. 1A-1B) and also the ability to subsequently be shrunk via application of heat thereto, or relaxed, if elastically stretched, to reduce the length of the heat-shrunken or elastic yarn 26', 26", thereby causing the wall 12 to shrink and constrict diametrically into a radially contracted second state (FIGS. 2A-2B) to bring the wall 12 into a snug or relatively snug fit about the elongate member 14.

The wall 12 has a first section 28 including the non-heat-shrinkable and non-elastic warp yarns 24 woven with the weft-wise or fill yarns 26 formed from the non-heat-shrinkable yarn 26 and a second section 30 including weft-wise or fill yarns formed from the heat-shrinkable 26' or elastic yarn 26". The first section 28 extends lengthwise between the opposite ends 20, 22 and spans (X) degrees about the circumference of the wall 12 between opposite lengthwise extending edges 32, 34. The second section 30 extends lengthwise between the opposite ends 20, 22 and spans (360-X) degrees about the circumference of the wall 12. The second section 30 and the heat-shrinkable 26' or elastic yarn 26" thereof extends continuously as an uninterrupted yarn between the opposite edges 32, 34 of the first section 28. The heat-shrinkable 26' or elastic yarn 26" can be provided as single yarn forming the entirety of the second section 30, or the heat-shrinkable 26' or elastic yarn 26" can be provided as a plurality of separate, individual yarns forming the second section 30. The heat-shrinkable 26' or elastic yarn 26" meanders in serpentine fashion back and forth between the opposite edges 32, 34 in shoe-lace or corset-lace-like fashion.

Figure 1B:
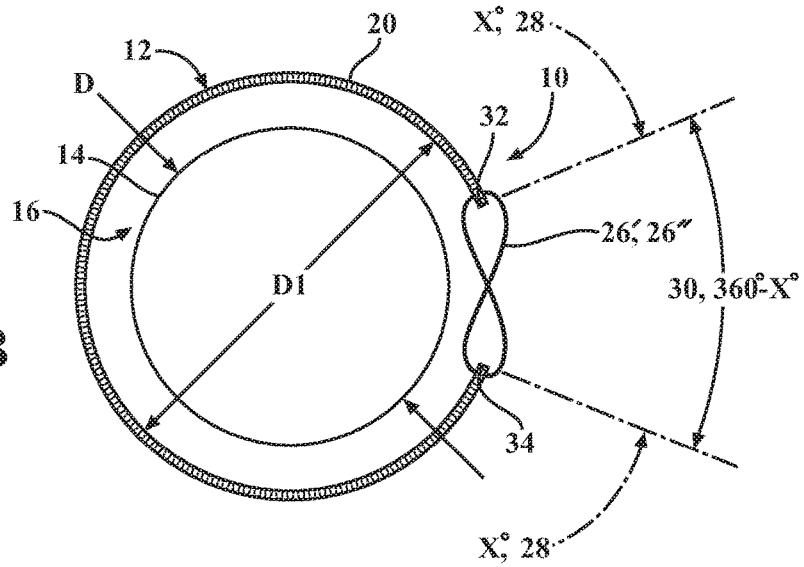
FIG. 1B is a schematic end view of the sleeve and elongate member of FIG. 1A.
Figure 2A:
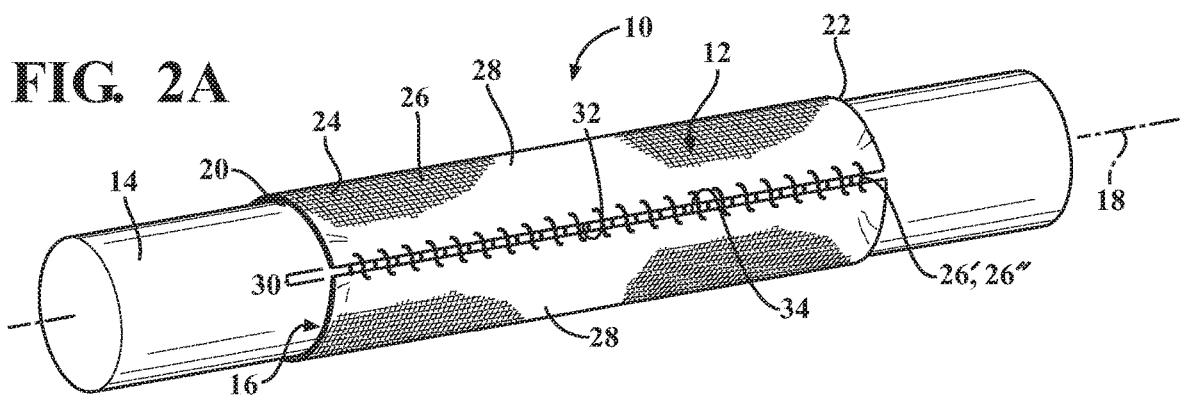
FIG. 2A is a schematic isometric view of the tubular sleeve of FIG. 1A shown in a radially contracted second state in a relatively snug fit about the elongate member.
Figure 2B:
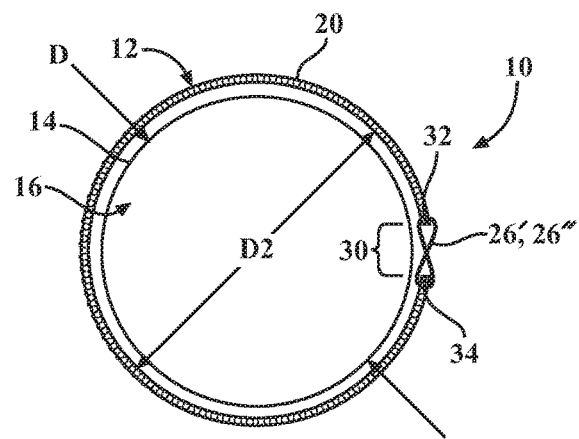
FIG. 2B is a schematic end view of the sleeve and elongate member of FIG. 2A.

As shown in FIGS. 1A-1B, with the heat-shrinkable 26' or elastic weft yarn 26" of the second section 30 in a non-heat-shrunken or stretched state, as initially fabricated, the sleeve wall 12 has an enlarged first diameter D1 that is sufficiently larger than the diameter D of the elongate member 14 over which the sleeve 10 is to be installed. As such, the sleeve 10 can be easily disposed over and about the elongate member 14 to be protected. Then, when placed in the desired position about the elongate member 14, heat can be readily applied to the heat-shrinkable weft yarn 26', thereby causing the yarn 26' to shrink in length and constrict the wall 12 from the enlarged first diameter D1 to a constricted second diameter D2 (FIGS. 2A-2B) that is less than the first diameter D1. In the alternative, if the weft yarn is provided as an elastic yarn weft yarn 26", the force applied to stretch the yarn 26" can be released, whereupon the length of the elastic yarn 26" is decreased, thereby causing the wall 12 to constrict circumferentially from the enlarged first diameter D1 to a constricted second diameter D2 (FIGS. 2A-2B) that is less than the first diameter D1. It is to be appreciated that the shrinking of the wall 12 is caused by drawing the opposite edges 32, 34 toward one another in response to the shrinking of the heat-shrinkable yarn 26' or relaxed tensioning of the elastic yarn 26". As such, upon heat-shrinking the yarn 26' or release of tension from the elastic yarn 26", the wall 12 can be brought into a snug, close fit relation with an outer surface of the elongate member 14, thereby minimizing the envelop of space occupied by the assembly and, if desired, the wall 12 can be constricted into snug abutment with the elongate member 14 to reduce the potential for slip between the sleeve 10 and the elongate member 14. It is to be recognized that by having only a portion of the wall surface containing heat-shrinkable 26' or elastic yarn 26" that the cost associated with the heat-shrinkable 26' or elastic yarn 26" is reduced compared to a sleeve having heat-shrinkable or elastic yarn extending about the entirety of the wall circumference. Further, with the heat-shrinkable 26' or elastic yarn 26" extending in uninterrupted fashion between the opposite edges 32, 34, no secondary fasteners are needed to secure the sleeve 10 about the elongate member 14.

Figure 3A:
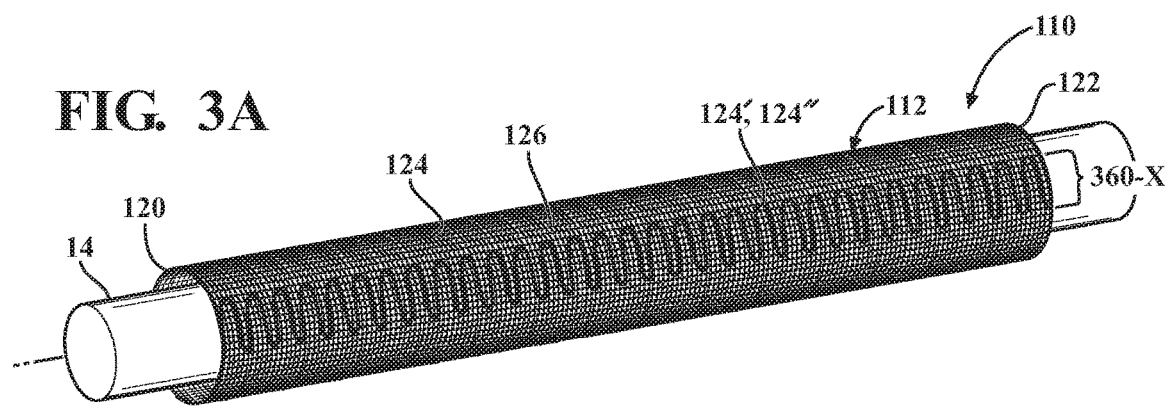
FIG. 3A is a isometric view of a tubular sleeve constructed in accordance with another embodiment of the invention shown in a radially expanded first state about an elongate member to be protected.
Figure 3B:
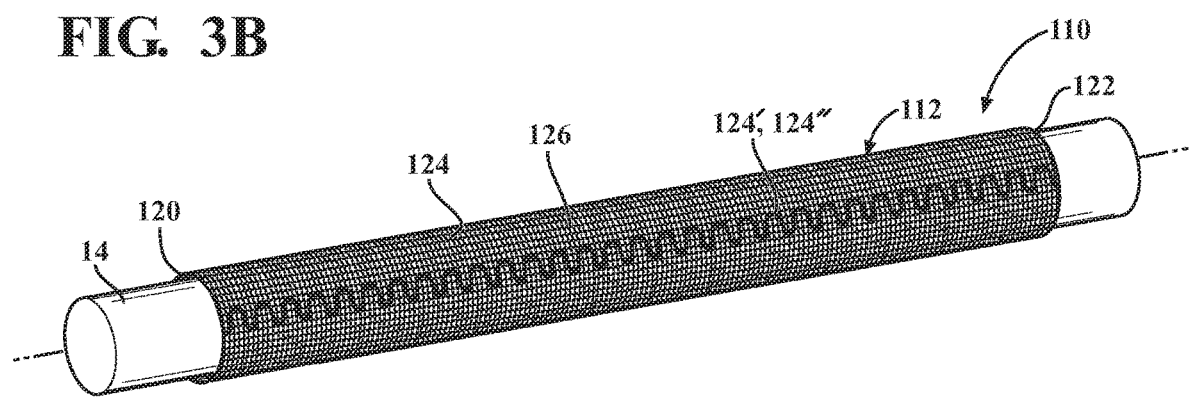
FIG. 3B is a schematic isometric view of the tubular sleeve of FIG. 3A shown in a radially contracted second state in a relatively snug fit about the elongate member.

In FIG. 3A (prior to being constricted) and 3B (after being constricted), another embodiment of a sleeve 110 is shown, wherein the same reference numerals as used above, offset by a factor of 100, are used to identify like features. The sleeve 110 has a circumferentially continuous woven wall 112 including warp yarns 124 and fill yarns 126, which can be provided as the same types of yarn discussed above for warp and fill yarns 24, 26; however, rather than the fill yarns 126 being provided as heat-shrinkable yarns, a selected number of the warp yarns can be provided as heat-shrinkable 124' or elastic yarns 124", such as 1 or more, but less than the entirety of the warp yarns. The heat-shrinkable or elastic yarn(s) 124', 124" is woven as a warp yarn and deviated or inserted in predetermined locations along a weft-wise direction (weft insertion) and looped about an anchor warp yarn(s), such that upon heat-shrinking or relaxing the warp extending, weft-inserted yarn 124', 124", the wall 112 is caused to constrict radially and circumferentially. It should be recognized that by being able to constrict the wall 112 with a select number of warp yarn(s) 124', 124" inserted at a predetermined location along a weft-wise direction, shown in FIGS. 3A and 3B as being inserted continuously along the entire length of the wall 112 in a generally sinusoidal fashion, and over a predetermined angle of arc (360-X) about the circumference, such as ranging between about 15-90 degrees, depending on the application, that substantially less heat-shrinkable yarn is required to provide the heat-shrinking or otherwise constricting capability of the sleeve 110 in comparison to a sleeve containing all heat-shrinkable weft yarn.

Figure 4A:
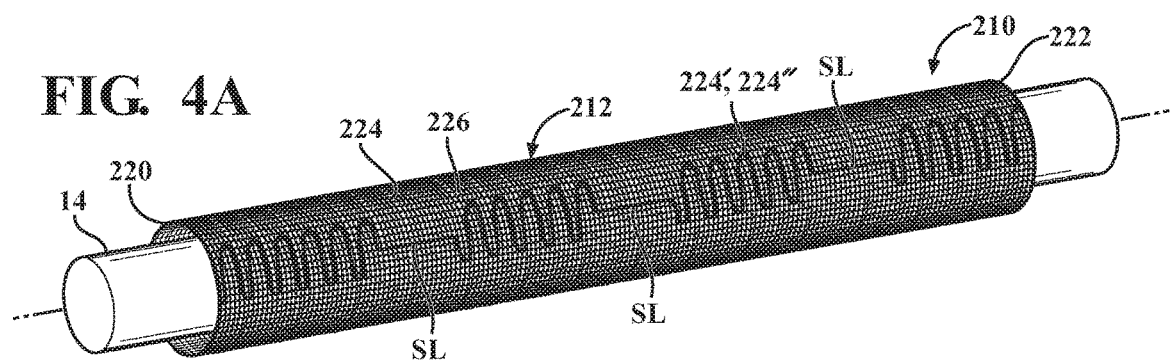
FIG. 4A is a isometric view of a tubular sleeve constructed in accordance with yet another embodiment of the invention shown in a radially expanded first state about an elongate member to be protected.
Figure 4B:
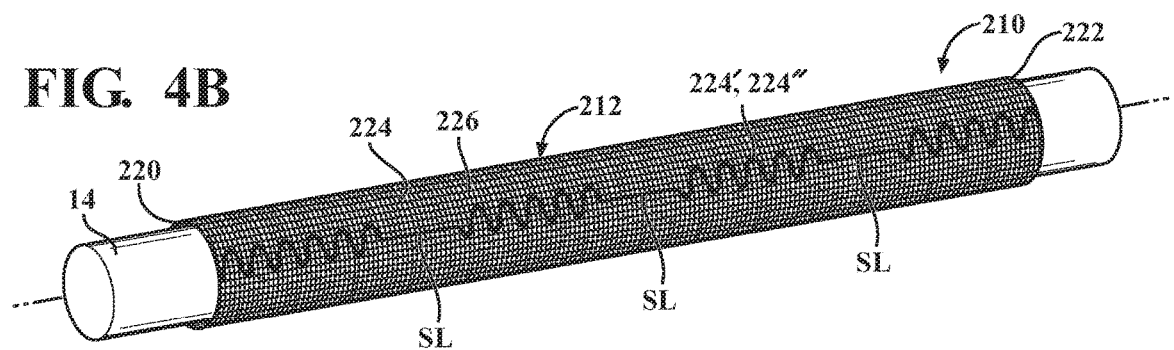
FIG. 4B is a schematic isometric view of the tubular sleeve of FIG. 4A shown in a radially contracted second state in a relatively snug fit about the elongate member.

In FIGS. 4A and 4B, another embodiment of a sleeve 210 is shown, wherein the same reference numerals as used above, offset by a factor of 200, are used to identify like features. The sleeve 210 is similar to the sleeve 110, and thus, has a circumferentially continuous woven wall 212 including warp yarns 224 and fill yarns 226. Further, a selected number of the warp yarns can be provided as heat-shrinkable 224' or elastic yarns 224", such as 1 or more, but less than the entirety of the warp yarns. The heat-shrinkable or elastic yarn(s) 224', 224" is woven as a warp yarn and deviated or inserted in predetermined locations along a weft-wise direction (weft insertion) and looped about an anchor warp yarn(s). In contrast to the sleeve 110, the heat-shrinkable or elastic yarn(s) 224', 224" is deviated or inserted at a predetermined location along a weft-wise direction, shown as being intermittently inserted at select locations, wherein the select locations are spaced axially from one another by a straight length SL of the heat-shrinkable or elastic yarn(s) 224', 224". Accordingly, even less heat-shrinkable or elastic yarn(s) 224', 224" is required for the construction and function of the sleeve 210 given the presence of the straight length SL sections. It is to be recognized that as many of the intermittently inserted sections can be provided, and further, that the intermittently inserted sections can be spaced any suitable length via the straight length section SL from one another, as needed to provide the desired percent and force of constriction of the sleeve wall 212.

Figure 5A:
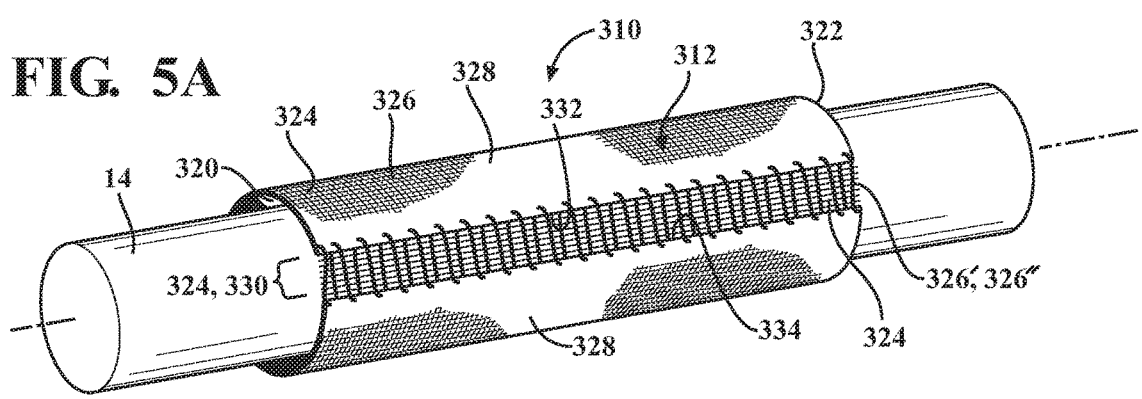
FIG. 5A is a isometric view of a tubular sleeve constructed in accordance with yet another embodiment of the invention shown in a radially expanded first state about an elongate member to be protected.
Figure 5B:
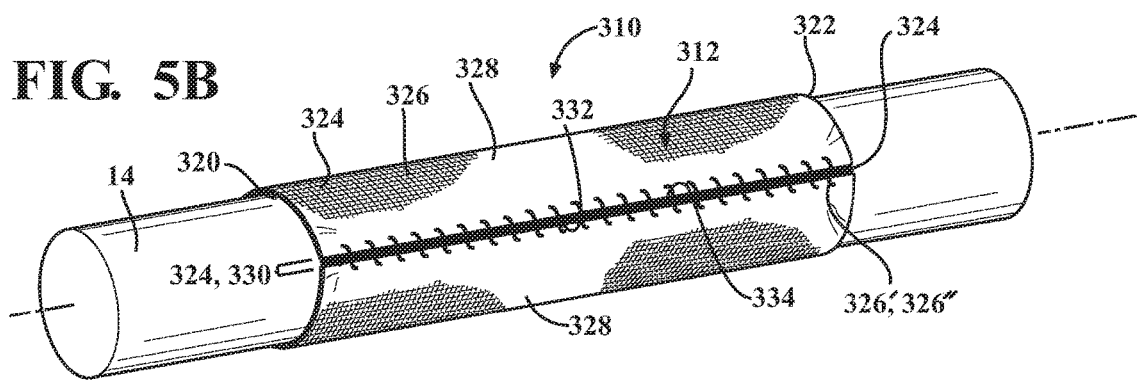
FIG. 5B is a schematic isometric view of the tubular sleeve of FIG. 5A shown in a radially contracted second state in a relatively snug fit about the elongate member.

In FIGS. 5A and 5B, another embodiment of a sleeve 310 is shown, wherein the same reference numerals as used above, offset by a factor of 300, are used to identify like features. The sleeve 310 is similar to the sleeve 10, and thus, has a circumferentially continuous woven wall 312 including warp yarns 324 and fill yarns 326. The wall 312 has a first section 328 including the non-heat-shrinkable or non-elastic warp yarns 324 woven with non-heat-shrinkable and non-elastic weft-wise or fill yarns 326 and a second section 330 including weft-wise or fill yarns formed from the heat-shrinkable 326' or elastic yarn 326". The first section 328 extends lengthwise between the opposite ends 320, 322 and spans (X) degrees about the circumference of the wall 312, and the second section 330 extends lengthwise between the opposite ends 320, 322 and spans (360-X) degrees about the circumference of the wall 312. The second section 330, in addition to including the heat-shrinkable 326' or elastic yarn 326", which can be woven to extend continuously as an uninterrupted yarn between the opposite edges 332, 334 of the first section 328, can further include non-heat-shrinkable and non-elastic warp yarns 324, such as those provided in the first section 328. As such, added protection is provided via the warp yarns 324 in the second section 330 upon constricting the wall 312, with the warp yarns 324 filling and covering any voids that may otherwise result in their absence. It is to be understood that the weft heat-shrinkable yarns 326' or elastic yarns 326" can be woven with the warp yarns 324 in any desire pattern, such as the same pattern used to weave the first section 328, by way of example and without limitation.

It is contemplated herein that for the embodiments discussed above, the angle of arc over which the heat-shrinkable or elastic yarn(s) 26', 26", 124', 124", 224', 224", 326', 326" occurs can be controlled to provide the desired about of radial constriction of the wall 12, 112, 212, 312 wherein the amount of constriction desired can depend on the type of elongate member being protected. For example, if the elongate member is a more rigid member, such as a polyamide fuel line or the like, the amount of radial constriction may be less than that for a more elastic elongate member, such as a rubber hose, wherein in the former a degree of arc (360-X) may be between about 15-30 degrees, while in the latter, a degree of arc (360-X) may be between about 45-90 degrees. It is to be recognized that this also applies to the sleeve 10 discussed above.

The non-heat-shrinkable or non-elastic yarns 24, 26, 124, 126, 224, 226, 324, 326 can be provided as any suitable yarn, including monofilament and/or multifilament. It has been found that providing the warp filaments 24, 124, 224, 324 as high tenacity multifilaments, such as from a highly texturized PET yarn having a tenacity of about 6.3 grams/denier (g/d), and providing the weft filaments 26, 126, 226, 326 as monofilaments, such as from PET having a diameter of about 0.22 mm, provides exceptional mechanical protection against abrasion, while also enhancing manufacturability. However, it is to be recognized that the non-heat-shrinkable or non-elastic yarns 24, 26, 124, 126, 224, 226, 324, 326 can be provided having a tenacity less than 6 g/d, particularly where applications require less mechanical protection and more acoustic and/or electromagnetic interference protection.

Figure 6A:
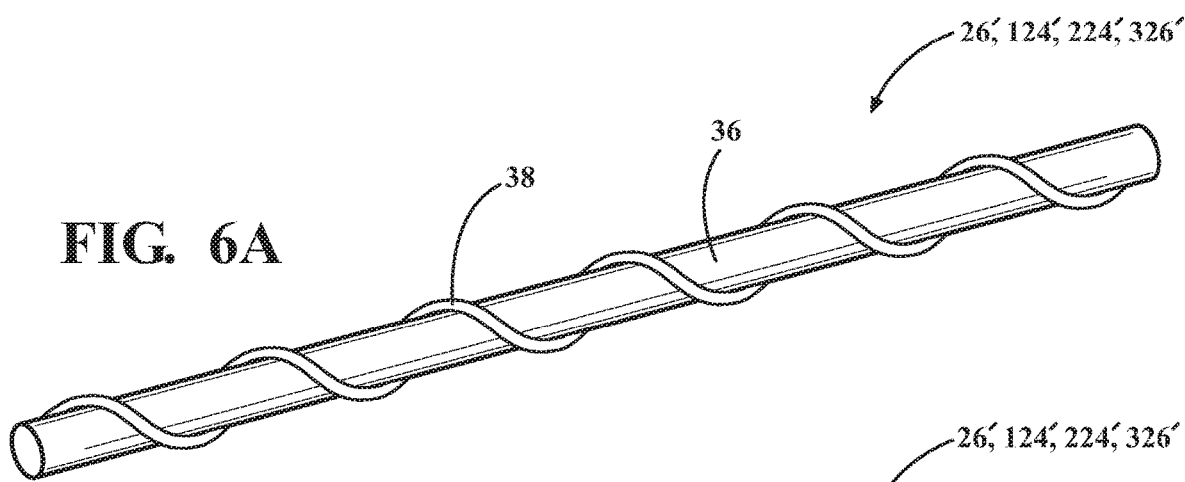
FIG. 6A shows an alternate embodiment of a shrinkable yarn for constructing a shrinkable portion of a sleeve of the disclosure.
Figure 6B:
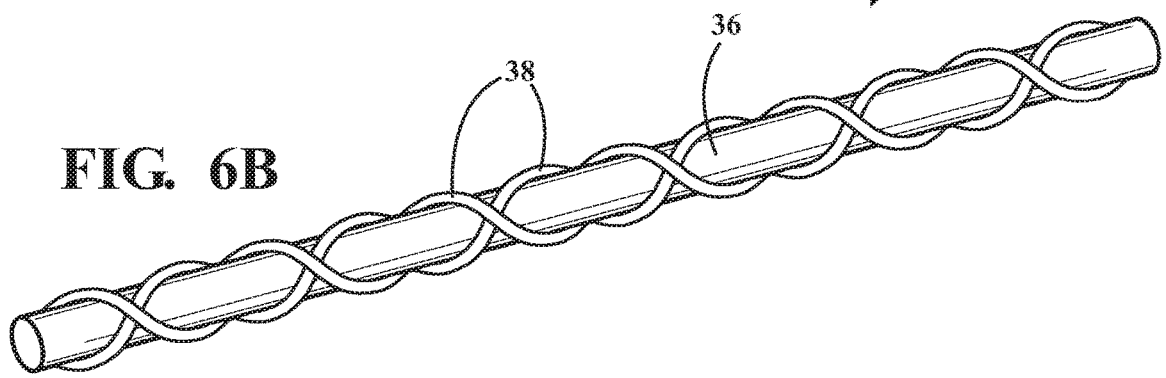
FIG. 6B shows another alternate embodiment of a shrinkable yarn for constructing a shrinkable portion of a sleeve of the disclosure.

It is further contemplated herein that the type of yarn used for the heat-shrinkable yarn 26', 124', 224', 326' can be provided solely as a thermally shrinkable polyethylene (PE) monofilament yarn; however, it has been discovered that by wrapping the heat-shrinkable yarn 26', 124', 224', 326' with a low melt, heat-fusible yarn, end-fray can be significantly reduced, such as during cutting of the sleeve 10, 110, 210, 310 to length and while in use. In accordance with one example, a wrapped, heat-shrinkable yarn 26', 124', 224', 326' can be provided as a heat-shrinkable monofilament 36 of a polymeric material (FIGS. 6A and 6B), such as polyethylene (PE), for example, having a diameter between about 0.20-0.40 mm, for example, wherein a sample was made having a diameter of 0.38 mm. Further, the yarn 26', 124', 224', 326' includes the at least one low melt, heat-fusible yarn 38 served or twisted therewith, shown in FIG. 6A as a single low melt, heat-fusible yarn 38 served helically about the monofilament 36, and shown in FIG. 6B as a pair of low melt, heat-fusible yarns 38 served helically about the monofilament 36 in opposite helical directions to one another. The low melt, heat-fusible yarn 38 has a lower melt temperature than the heat-shrinkable monofilament 36, which allows the low melt, heat-fusible yarn 38 to be at least partially melted without causing the heat-shrinkable monofilament 36 to shrink, or without causing the heat-shrinkable monofilament 36 to shrink substantially. Further, the low melt, heat-fusible yarn 38 is provided in all the embodiments having a significantly reduced diameter relative to the yarn about which it is served, and is generally provided having a diameter of within a range of about 0.05-0.10 mm. As such, the amount of material used for the low melt, heat-fusible yarn 38 is minimized, thereby reducing cost of the sleeve 10, 110, 210, 310 while at the same time enhancing the ability to attain clean, substantially end-fray free cut ends 20, 22; 120, 122; 220, 222; 320, 322.

Depending on the application needs, the wall 12, 112, 212, 312 can be constructed having any suitable size, including length, width and diameter. Further, the yarns 24, 26, 124, 126, 224, 226, 324, 326 can be woven using any desired weave pattern, such as a plain weave pattern, with each warp and fill yarn 24, 26, 124, 126, 224, 226, 324, 326 undulating in alternating fashion over and under one another, as is understood in the art of weaving; however, other weave patterns are contemplated herein, such as twill, basket, and satin or sateen, by way of example, which are also understood in the art of weaving. Further yet, the yarns 24, 26, 124, 126, 226, 324, 326 can be knit using any desired knit pattern.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A protective textile sleeve, comprising:
a circumferentially continuous wall extending lengthwise along a longitudinal axis between opposite ends, said wall having a first section formed in its entirety from non-elastic, non-heat-shrinkable yarn and a second section formed in its entirety from at least one of elastic yarn and heat-shrinkable yarn, wherein said first section has opposite edges that extend lengthwise between said opposite ends and spans (X) degrees about the circumference of said wall between opposite lengthwise extending edges, and wherein said second section extends lengthwise between said opposite ends and spans (360-X) degrees about the circumference of said wall, and wherein said at least one elastic yarn and heat-shrinkable yarn of said second section meanders in serpentine fashion back and forth between said opposite edges of said first section from one of said opposite ends to the other of said opposite ends continuously as an uninterrupted yarn.

2. The protective textile sleeve of claim 1, wherein said second section includes elastic yarn.

3. The protective textile sleeve of claim 1, wherein said second section includes heat-shrinkable yarn.

4. The protective textile sleeve of claim 3, wherein said first section includes lengthwise extending warp multifilament yarns.

5. The protective textile sleeve of claim 4, wherein said first section includes circumferentially extending, non-heat-shrinkable weft monofilament yarns.

6. The protective textile sleeve of claim 5, wherein said circumferentially extending, non-heat-shrinkable weft monofilament yarns have a diameter between 0.15-0.25 mm.

7. The protective textile sleeve of claim 5, wherein said warp multifilament yarns have a tenacity equal to or greater than 6.0 grams per denier (g/d).

8. The protective textile sleeve of claim 7, wherein said circumferentially extending, non-heat-shrinkable weft monofilament yarns have a diameter between 0.15-0.25 mm.

9. The protective textile sleeve of claim 1, wherein (360-X) is between 45 and 90 degrees.

10. The protective textile sleeve of claim 1, wherein (360-X) is between 15 and 30 degrees.

11. The protective textile sleeve of claim 1, wherein said heat-shrinkable yarn includes a heat-shrinkable monofilament wrapped with a low-melt, heat-fusible monofilament.

12. A protective textile sleeve, comprising:
a wall extending lengthwise along a longitudinal axis between opposite ends, said wall having a woven first section formed in its entirety from non-heat-shrinkable warp yarns extending lengthwise in generally parallel relation with longitudinal axis and non-heat-shrinkable weft yarn extending circumferentially in generally transverse relation to the warp yarn, and a second section formed in its entirety from heat-shrinkable yarn, wherein said first section has opposite edges that extend lengthwise between said opposite ends and spans (X) degrees about the circumference of said wall between opposite lengthwise extending edges, and wherein said second section extends lengthwise between said opposite ends and spans (360-X) degrees about the circumference of said wall, and wherein said heat-shrinkable yarn of said second section meanders in serpentine fashion back and forth between said opposite edges of said first section from one of said opposite ends to the other of said opposite ends continuously as an uninterrupted yarn.

13. The protective textile sleeve of claim 12, wherein the second section is formed from a single yarn.

14. The protective textile sleeve of claim 13, wherein the heat-shrinkable yarn is a weft yarn.

15. The protective textile sleeve of claim 13, wherein the heat-shrinkable yarn is a warp yarn.

16. A protective textile sleeve, comprising:
a wall extending lengthwise along a longitudinal axis between opposite ends, said wall having a woven first section formed in its entirety from non-heat-shrinkable warp yarns extending lengthwise in generally parallel relation with longitudinal axis and non-heat-shrinkable weft yarn extending circumferentially in generally transverse relation to the warp yarn, and a second section formed in its entirety from heat-shrinkable yarn, wherein said first section has opposite edges that extend lengthwise between said opposite ends and spans (X) degrees about the circumference of said wall between opposite lengthwise extending edges, and wherein said second section extends lengthwise between said opposite ends and spans (360-X) degrees about the circumference of said wall, and wherein said heat-shrinkable yarn of said second section connects said opposite edges of said first section to one another.

17. The protective textile sleeve of claim 16, wherein the second section is formed from a single yarn.

18. The protective textile sleeve of claim 17, wherein the heat-shrinkable yarn is a weft yarn.

19. The protective textile sleeve of claim 17, wherein the heat-shrinkable yarn is a warp yarn.

* * * * *